US006556958B1

United States Patent
Chickering

(10) Patent No.: US 6,556,958 B1
(45) Date of Patent: *Apr. 29, 2003

(54) FAST CLUSTERING WITH SPARSE DATA

(75) Inventor: D. Maxwell Chickering, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,600

(22) Filed: Apr. 23, 1999

(51) Int. Cl.$^7$ .......................... G06F 7/60; G06F 17/10; G06F 101/00

(52) U.S. Cl. ............................... 703/2; 707/7; 707/101; 706/21

(58) Field of Search .......................... 703/1–2; 707/3–7, 707/100–104; 706/21

(56) References Cited

U.S. PATENT DOCUMENTS

| 5,603,022 | A |  | 2/1997  | Ng et al. |  |
|---|---|---|---|---|---|
| 5,704,017 | A |  | 12/1997 | Heckerman et al. | 395/61 |
| 5,832,182 | A |  | 11/1998 | Zhang et al. |  |
| 5,977,889 | A | * | 11/1999 | Cohen | 341/55 |
| 6,032,146 | A | * | 2/2000  | Chadha et al. | 707/3 |
| 6,360,224 | B1 | * | 3/2002 | Chickering | 707/100 |

FOREIGN PATENT DOCUMENTS

EP            0 789 309 A2       8/1997

OTHER PUBLICATIONS

International Search Report, PCT/US00/10769 published Nov. 2, 2000.*

Baker et al, "Distributional Clustering of Words for Text Classification", Annual ACM Conference on Research and Development in Information Retrieval, pp. 96–103 (Aug. 1998).*

Goil et al, "High Performance Multidimensional Analysis of Large Datasets", Proceeding of the ACM First International Workshop on Data Warehousing and OLAP, pp. 34–39 (Aug. 1998).*

Apté et al, "Automated Learning of Decision Rules for Text Categorization", ACM Transactions on Information Systems, vol. 12 No. 3, pp. 233–251 (Jul. 1994).*

Linoff et al, "Compression of Indexes with Full Positional Information in Very Large Text Databases", Proceedings of the 16th Annual International ACM Conference on Research and Development in Information Retrieval, pp. 88–95 (Jun. 1993).*

Database Inspec 'Online! Institution of Electrical Engineers, Stevenage, GB; Inspec No. AN6294241, XP002145527 abstract & Meila M et al.: "An experimental comparison of several clustering and initialization methods" Proc $14^{TH}$ Conf on Uncertainty in AI, Jul. 24, 1998 through Jul. 26, 1998, pp. 386–395, Madison, WI, USA.

U.S. patent application Ser. No. 08/802,759, filed Jul. 30, 1997, unissued, "Belief Networks" pending ap.

* cited by examiner

Primary Examiner—Samuel Broda
(74) Attorney, Agent, or Firm—Amin & Turocy, LLP

(57) ABSTRACT

Efficient data modeling utilizing sparse representation of a data set. In one embodiment, a computer-implemented method such that a data set is first input. The data set has a plurality of records. Each record has at least one attribute, where each attribute has a default value. The method stores a sparse representation of each record, such that the value of each attribute of the record is stored only if the value of the attribute varies from the default value. A data model is then generated, utilizing the sparse representation, and the model is output. The generation of the data model in one embodiment is in accordance with the Expectation Maximization (EM) algorithm.

27 Claims, 5 Drawing Sheets

FAST CLUSTERING WITH SPARSE DATA

FIELD OF THE INVENTION

This invention relates generally to data modeling, and more particularly to efficient data modeling utilizing a sparse representation of the initial data set.

BACKGROUND OF THE INVENTION

Data modeling has become an important tool in solving complex and large real-world computerizable problems. For example, a web site such as www.msnbc.com has many stories available on any given day or month. The operators of such a web site may desire to know whether there are any commonalties associated with the viewership of a given set of programs. That is, if a hypothetical user reads one given story, can with any probability it be said that the user is likely to read another given story. Yielding the answer to this type of inquiry allows the operators of the web site to better organize their site, for example, which may in turn yield increased readership.

For problems such as these, data analysts frequently turn to advanced statistical tools. One such tool is the Expectation Maximization algorithm (hereinafter, the EM algorithm), known within the art, many times used in conjunction with a naïve-Bayes (or, Bayesian) model, as also known within the art. The EM algorithm permits a data analyst to assign each data record (e.g., the stories a given user has read) to a cluster of like data records, where each cluster has a probabilistic dependence for each story. Thus, assignment of a user into a cluster is useful to predict what other stories or types of stories a user may have also read, or may read in the future. (Generally, a cluster is a collection of records, where each record has a similar set of attribute values.)

A disadvantage to utilization of the EM algorithm is that generally, as the size of the data set increases, the running time of the algorithm increases even moreso. This is because the EM algorithm typically cycles over the records in a data set many times, in an iterative manner, until a given convergence criterion is met. This is problematic for problems such as the web site example just described, because typically the data set can run into the millions of records, impeding timely analysis thereof. Thus, a data analyst may not utilize the EM algorithm as much as he or she would like to.

For these and other reasons, there is a need for the present invention.

SUMMARY OF THE INVENTION

The invention relates to efficient data modeling utilizing a sparse representation of the data set. In one embodiment, a data set is first input. The data set has a plurality of records. Each record has at least one attribute, where each attribute has a default value. The attributes of one record can in one embodiment largely overlap with the attributes of another record, although the specific values of the attributes for one record may not so overlap. The method stores a sparse representation of each record, such that the value of each attribute of the record is stored only if it varies from the default value (that is, if the value equals the default value, it is not stored). A data model is then generated, utilizing the sparse representation, and the model is output.

Embodiments of the invention, by utilizing the sparse representation summarized in the preceding paragraph, provide for more efficient and less time-intensive data modeling of the data set. For example, in the context of the EM algorithm, the determination of a joint probability distribution over the cluster membership and the record values is generally required to be made for each record. This typically requires determination of a posterior probability for each attribute of each record, which in the prior art can be a time-consuming process. As a further example, embodiments of the invention provide for speeded-up clustering, as can be appreciated by those of ordinary skill within the art.

However, under embodiments of the invention, determination of a posterior probability can involve only initially generating a joint probability based on the default value of an attribute, and determining the posterior probability based on this joint probability—such that this posterior probability is used for any record having the default value for this attribute. In other words, the posterior probability does not have to be generated anew for every record with this attribute, but rather once for the default value of the attribute, and then subsequently only for those records having a value for this attribute varying from the default value. This greatly decreases the amount of time it takes for the EM algorithm to be run.

Thus, embodiments of the invention allow for use of the EM algorithm to cluster a sparse data set, without examining the value of every attribute of every record. In instances where each record contains, on average, only a small set of attributes that are not in their default state, embodiments of the invention can yield great decreases in run time.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

Figure 1:
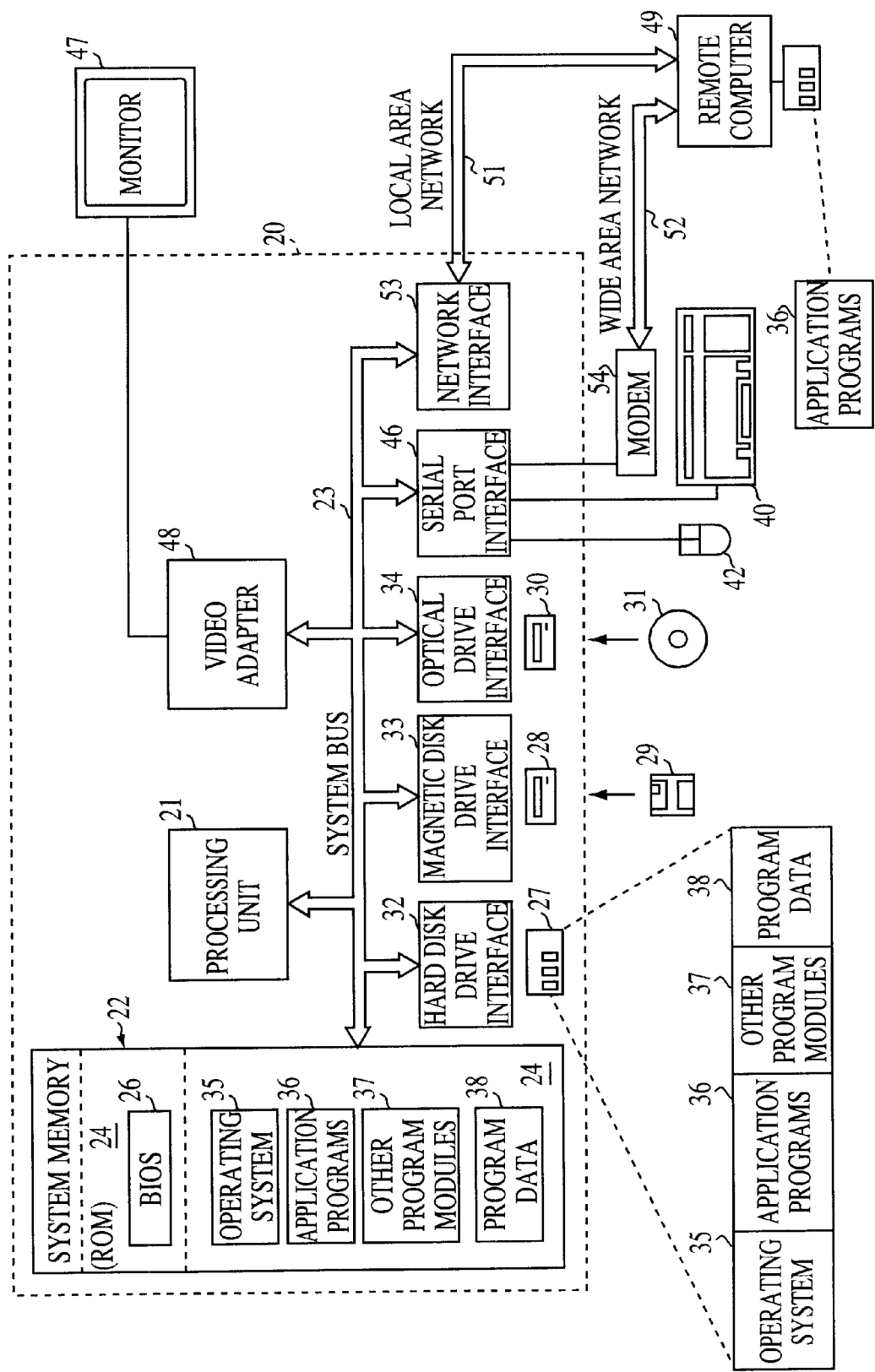
FIG. 1 is a diagram of an operating environment in conjunction with which embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The detailed description is divided into sections as follows. First, a description of an operating environment in conjunction with which embodiments of the invention may be practiced is provided. Next, a description of a naïve-Bayes (Bayesian) model utilizing clusters is presented. Finally, a conclusion is provided. A description of a sparse representation of a data set according to an embodiment of the invention is then presented. Thereafter, a description of a method according to an embodiment of the invention, implementing a modified EM algorithm and utilizing the sparse representation of the preceding section of the detailed description, is given. A description of a system according to an embodiment of the invention is then provided, followed by a conclusion section.

Operating Environment

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Naïve-Bayes Model and Clustering

In this section, description is provided of a naïve-Bayes model, as known within the art, that can be utilized in conjunction with embodiments of the invention. The model is used to represent ajoint probability distribution over the set of all attributes in a domain, and the cluster membership. The model is described in conjunction with reference to FIG. 2. It is noted that the naïve-Bayes model described herein is not necessarily a limitation of all embodiments of the invention; that is, sparse representation as described in subsequent sections of the detailed description may be applicable for use with other models.

A naïve-Bayes model that can be used in conjunction with at least some embodiments of the invention is used to model a particular data set, or domain. For example, the domain can be the domain of television shows that a person may watch, such that a data analyst is interested in clustering people into three groups, based on their viewing behavior. In this example, the attributes of the domain correspond to television shows, and the value for each attribute can be "no" (did not watch the show), or "yes" (did watch the show).

Figure 2:
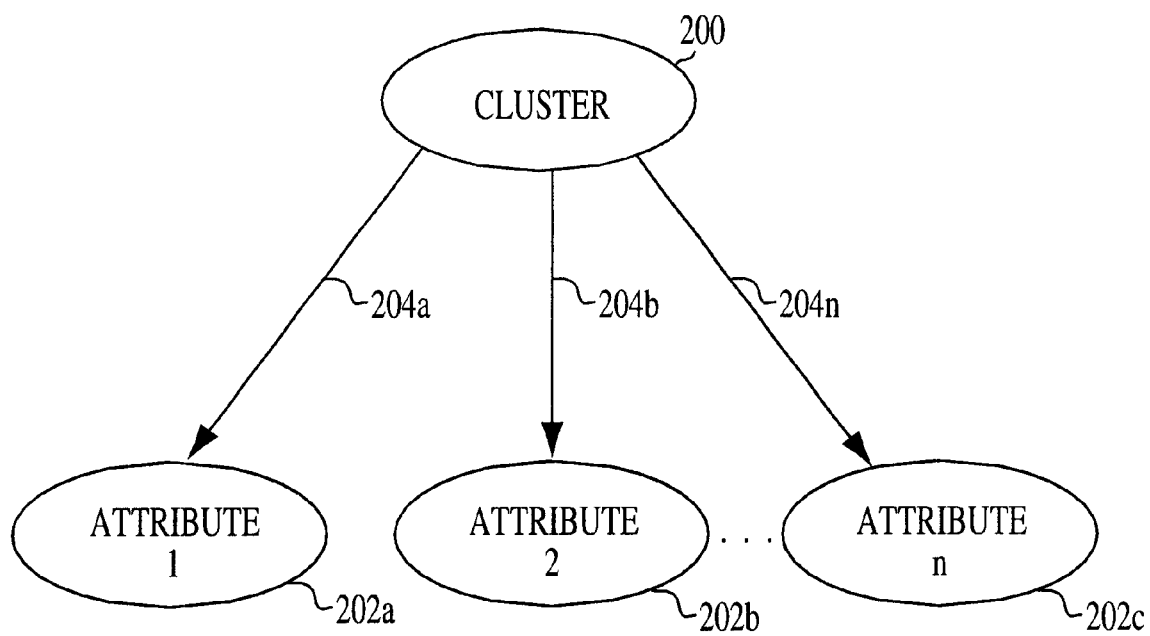
FIG. 2 is a diagram of an illustrative Bayesian network showing a single node corresponding to the cluster membership, according to an embodiment of the invention.

Referring to FIG. 2, a cluster of a naïve-B ayes model is shown, as a Bayesian network. The model includes a cluster node 200, and attribute (or, variable) nodes 202a, 202b, . . . , 202n. In general, a Bayesian network includes one node for each variable (or, attribute), as well as a node that has a value for each cluster (the number of clusters is not explicitly shown in FIG. 2). Directed edges 204a, 204b, . . . , 204n correspond to probabilistic dependence—for example, for each attribute there is a probability distribution for each value of its parent (the cluster node).

It is noted that there are no edges between attribute nodes. This asserts the assumption that given the cluster value for a record, the values for each attribute are independent. That is, there is no probabilistic dependence among the attributes themselves once the cluster membership is known.

Each node in the Bayesian network is annotated with a set of parameters. The parameters stored in each node define the probability distribution over the variable, given the values of the parent variable (it is noted that a cluster node, such as the cluster node 200, does not have a parent variable or node). The symbol $\Theta$ is used to denote the set of all parameters stored in the model.

Next, $r_C$ is used to denote the number of states of the cluster node (that is, the number of clusters for the model). The cluster node stores parameters $\{\theta_{C=1}, \ldots, \theta_{C=rC}\}$, specifying the prior probability of a record (e.g., a user or a person) belonging to any particular cluster. That is:

$$p(C=c|\Theta)=\theta_{C=c}$$

Next, $r_{Ai}$ denotes the number of states for attribute i. Each attribute node $A_i$ stores, for each value c of the cluster node, a set of $r_{Ai}$ parameters $\{\theta_{Ai=1|C=c}, \ldots, \theta_{Ai=rAi|C=c}\}$ that specify the conditional probability that the attribute is in each of its states (for example, each state of an attribute being a different possible value for that attribute), given that the record is in cluster c. That is:

$$p(A_i=j|C=c, \Theta)=\theta_{Ai=j|C=c}$$

For example, in the television-watching example, it can be assumed that state 1 of each attribute corresponds to "did not watch" and state 2 of each attribute corresponds to "did watch". Thus, the probability that a person in cluster 2 watched the show corresponding to attribute 3 is equal to $\theta_{A3=2|C=2}$.

In many domains, the cluster membership for each record is not known. Given a parameterized model, the rules of probability can be applied to determine the posterior probability of each cluster, given any record in the dataset. Let n denote the number of attributes in the domain, and assume that for all i, $0 \leq i \leq n$, attribute $A_i$ has value $a_i$ for the record in question. Then, $$p(C = c \mid A_1 = a_1, \ldots, A_n = a_n, \Theta) = \frac{p(C = c, A_1 = a_1, \ldots, A_n = a_n \mid \Theta)}{\sum_{c'=1}^{r_C} p(C = c', A_1 = a_1, \ldots, A_n = a_n \mid \Theta)}$$

Using the independence assumptions from the model (attributes are independent given the cluster), $$p(C = c, A_1 = a_1, \ldots, A_n = a_n \mid \Theta) = p(C = c \mid \Theta) \prod_{i=1}^{n} p(A_i = a_i \mid C = c, \Theta)$$

All probabilities on the right side of the above equation are stored as parameters in the naïve-Bayes model. Consequently, the posterior probability that a record belongs to cluster c can be derived directly from these parameters:

$$p(C = c \mid A_1 = a_1, \ldots, A_n = a_n, \Theta) = \frac{\theta_{C=c} \prod_{i=1}^{n} \theta_{A_i=a_i|C=c}}{\sum_{c'=1}^{r_C} \theta_{C=c'} \prod_{i=1}^{n} \theta_{A_i=a_i|C=c'}}$$

Note that the denominator is the same regardless of the value of c, and is simply the sum of the joint probability for each value of c. In practice, it is desirable to first compute and store away the joint probability for each value c, accumulating the sum as it is done. Then, each of the stored joint probabilities is divided by the sum to obtain the posteriors.

There are two methods known in the art for assigning cluster membership to records in a dataset. In soft clustering (EM), records are fractionally assigned, according to the posterior probability above, to multiple clusters. In hard clustering (classification EM), each record is assigned to the cluster that is most probable.

Sparse Representation

In this section of the detailed description, sparse representation of a data set according to one embodiment of the invention is presented. The sparse representation is then used in conjunction with a modified EM algorithm described in the next section of the detailed description to provide for greatly reduced run times. The description in this section is made in conjunction with reference to FIG. 3.

In general, a sparse representation is defined as: for each attribute in a domain, a default value is defined. The default value for an attribute is that value that occurs most frequently in the data set. For example, in the television-watching example of the preceding section, "did not watch" is likely the most frequent value for most television shows for a user (since a given user can only watch one television show at a time). The records of a sparse representation explicitly store only those values for attributes that do not have their default value. That is, in storing a sparse representation of each record, the value of those attributes of the record are stored only upon determining that such values vary from the default values for that attribute.

Figure 3:
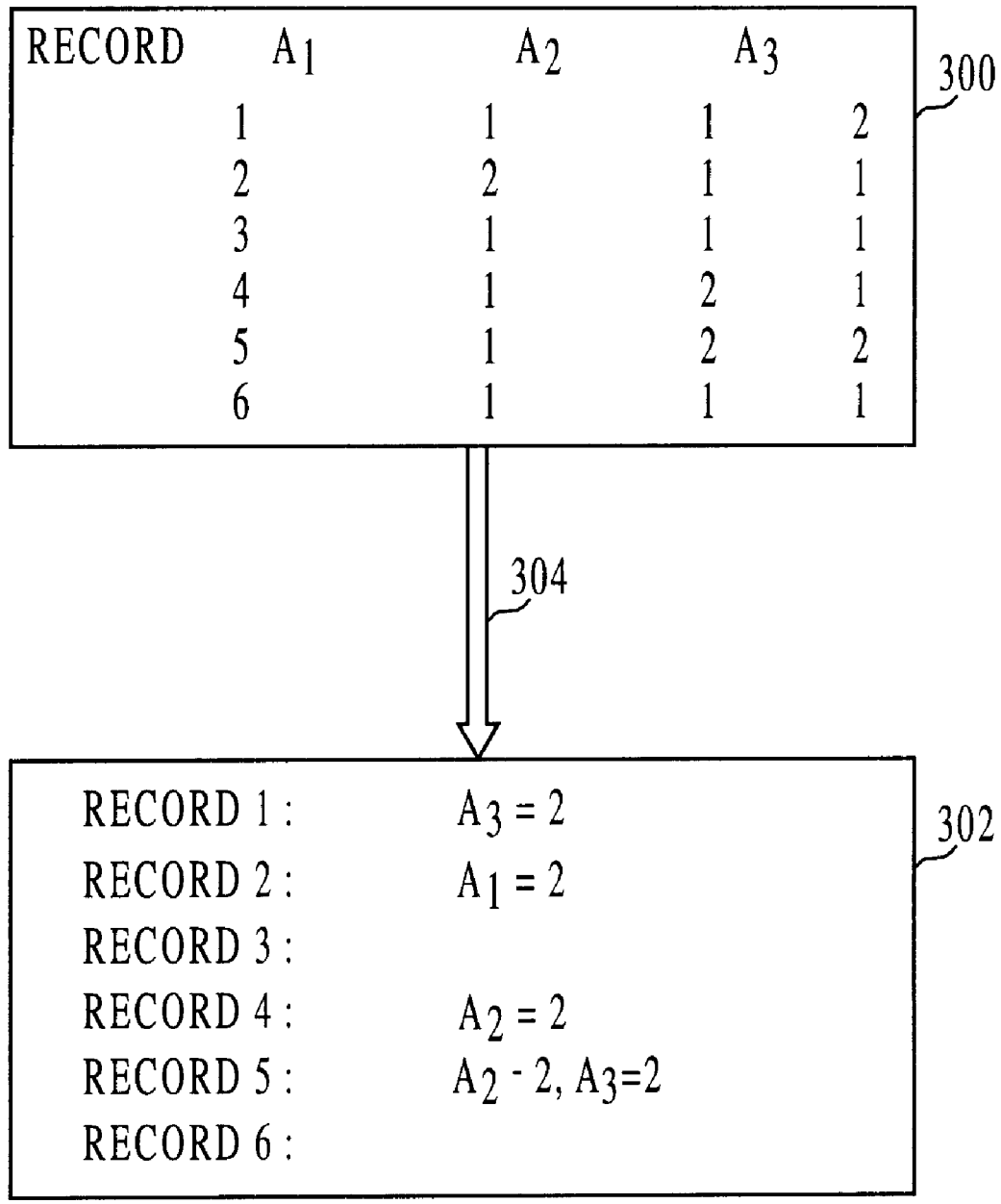
FIG. 3 is a diagram showing a sparse representation of a data set according to an embodiment of the invention.

This is shown by reference to FIG. 3, which is a diagram of six records in an example data set, along with its corresponding sparse representation. The data set 300 of FIG. 3 thus has three binary attributes $A_1$, $A_2$, and $A_3$, such that the default value for each attribute is 1. Furthermore, as shown in FIG. 3, the data set 300 has six records.

Therefore, in a sparse representation of the data set, as represented by 302 of FIG. 3, each record is stored as a list of attribute/value pairs, one such pair for each attribute in the record that does not have its default value. Thus, for attributes of a record that have the default value, no such pair is stored. This means that the representation of the data set as stored by embodiments of the invention is sparse, in that only attribute values of a record that vary from the default values for those attributes are stored.

To find the value of any attribute in a given record, the list of pairs is traversed. If the attribute in question is encountered in the list, then the corresponding value is returned. Otherwise, the default value of the attribute is returned. In one embodiment, the data is stored in a sparse representation on disk.

It is noted that using this representation can dramatically reduce the memory overhead for storing a large dataset. That is, where most attribute values for a given record in a given data set will be equal to the default values for those attributes, such attribute values are not stored in the sparse representation of the invention—rather only those attribute values that vary from the default values for those attributes are stored. As will be described in the next section of the detailed description, such a sparse representation provides for greatly reduced run times in generating a data model from the data set (for example, by the EM algorithm).

As shown in FIG. 3, the sparse representation 302 is generated from the data set 300 by a generating mechanism 304. The generating mechanism 304 can in one embodiment be a software program running on a computer such as that described in the first section of the detailed description, although the invention is not so limited. In such an embodiment, the data set 300 and the sparse representation 302 can be stored as data representing the data set 300 and the sparse representation 302, respectively, as residing on a computer-readable medium, such as a memory or a hard disk drive. Again, the invention is not so limited.

Method (Modified EM Algorithm)

Figure 4:
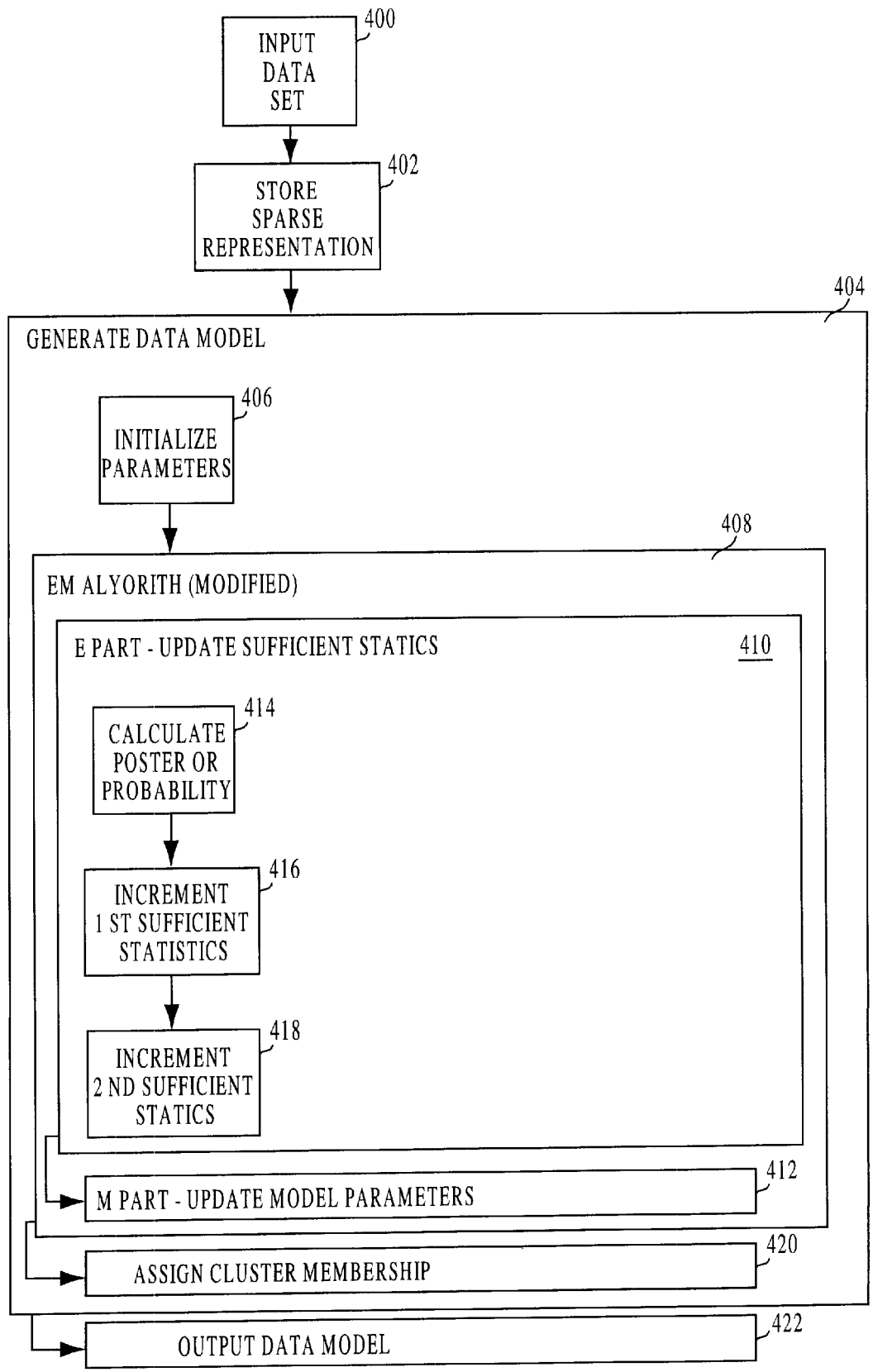
FIG. 4 is a flowchart of a method implementing a modified EM algorithm according to an embodiment of the invention; and, FIG. 5 is a diagram of a system according to an embodiment of the invention.

A method according to an embodiment of the invention is shown in FIG. 4. The method is a computer-implemented method that generates a data model according to a (modified) EM algorithm, utilizing a sparse representation of a data set. In particular, the data model generated is a naïve-Bayes model, as has been described, such that the EM algorithm is used to derive parameter values of the model, as those of ordinary skill within the art can appreciate. The computer-implemented method is desirably realized at least in part as one or more programs running on a computer— that is, as a program executed from a computer-readable medium such as a memory by a processor of a computer. The programs are desirably storable on a machine-readable medium such as a floppy disk or a CD-ROM, for distribution and installation and execution on another computer.

Before a description of the method of FIG. 4 is given, background regarding the EM algorithm is first provided. It is noted that if cluster assignment for each record (whether fractional or not) was known a priori, then the parameters of the naïve-Bayes model can be derived by using known counts, as known within the art. The counts that are needed to derive the parameters are known and referred to as sufficient statistics.

Let $N_{C=c}$ be the (hypothetical) known number of records that belong to cluster c. If there are N total records in the data, then the estimate for $\theta_{C=c}$ can be $$\theta_{C=c} = \frac{N_{C=c}}{N}$$

This assignment is known and referred to as the maximum likelihood estimation for the cluster parameter. The maximum likelihood estimation for the attribute parameters can also be derived from (hypothetical) known counts. In particular, let $N_{A_i=j, C=c}$ denote the number of records in the data for which $A_i=j$ and C=c. Then the maximum likelihood estimate for the attribute parameter is $$\theta_{A_i=j|C=c} = \frac{N_{A_i=j,C=c}}{N_{C=c}}$$

Note that the above parameter estimations depend only on the data. In practice, softening is usually incorporated into the estimations to both avoid setting parameters to values that are very close to zero or one, and allow the use of prior knowledge about the domain. Because prior knowledge has minimal influence on the parameter values for large data sets, the following (softened) estimates can be used for the parameters:

$$\theta_{C=c} = \frac{N_{C=c} + 1}{N + r_C}$$

$$\theta_{A_i=j|C=c} = \frac{N_{A_i=j,C=c} + 1}{N_{C=c} + r_{A_i}}$$

In at least some domains that can be used by embodiments of the invention, the cluster assignment for each record is unknown, and consequently the sufficient statistics used to derive the parameter values are not available. Given a set of parameter values, however, the expected sufficient statistics can be derived using those counts instead. In particular, $$S(C=c) = E(N_{C=c} | \Theta) = \sum_{n=1}^{N} p(C=c | \text{record } n, \Theta)$$

and $$S(A_i = j, C = c) = E(N_{A_i=j,C=c} | \Theta)$$
$$= \sum_{n=1}^{N} p(A_i = j, C = c | \text{record } n, \Theta)$$
$$= \sum_{n=1}^{N} p(C = c | \text{record } n, \Theta) \cdot 1^{A_i=j}(n)$$

where $1^{A_i=j}(n)$ is an indicator function that is equal to one if $A_i=j$ in record n, and zero otherwise.

Those of ordinary skill within the art can recognize and appreciate how to generalize the accumulation of sufficient statistics for other types of distributions. If an attribute is continuous, for example, a conditional Gaussian distribution may be used.

The method of FIG. 4 is now described. In 400, a data set having a plurality of records is input. The data set desirably represents a real-world event or events—for example, the stories read by users of a web site, the television shows watched by viewers, etc. Each record has at least one attribute. The set of all attributes is referred to as the attribute set for the problem domain. Each attribute has a default value. In general, the data set is desirably such that most attribute values for a given record are equal to the default value, although the invention is not so limited.

In 402, a sparse representation of the data set is generated, such that a sparse representation of each record of the data set is stored. This is accomplished as has been described in the previous section of the detailed description. That is, only the values of the attributes of a given record are stored that vary from the default values for the attributes—in other words, the value of an attribute of a record is stored only upon determining that the attribute of the record has a value varying from the default value for this attribute.

In 404, a data model of the data set is generated, utilizing the sparse representation generated and stored in 402. In one embodiment, this is a naïve-Bayes model, generated by utilizing the EM algorithm to determine sufficient statistics so that the parameters of the naïve-Bayes model can be determined. As described as follows, then, the data model generated specifically refers to the naïve-Bayes model in general and utilizing the EM algorithm in particular, although the invention is not necessarily so limited. Furthermore, the EM algorithm described herein is modified to take advantage of the sparse representation generated in 402.

Thus, in 406, the parameters Θ of the model are initialized in accordance with a predetermined manner, as those of ordinary skill within the art can appreciate. The invention is not limited to the manner by which parameter initialization is accomplished. For example, parameter initialization can be accomplished by randomly assigning values, or by marginal matching, both of which are known within the art.

In 408, the EM algorithm is performed. The EM algorithm has two parts, the E part in 410 to update expected sufficient statistics for each record in the data set, and the M part in 412 to update parameters regarding the data model. As those of ordinary skill within the art can appreciate, the E part and the M part are repeated in an iterative process until a predetermined convergence criterion is met. The invention is not particularly limited to any given convergence criterion, however.

In the E part of the EM algorithm, in 408 the following variables are first initialized: S(C=c) and S($A_i$=j, C=c) to zero, for all values of c,i, and j. Next, in 414, the posterior probability post(c,n)=p(C=c|record n, Θ) is calculated (determined), for all values of C. Because of the sparse representation of the data set, the posterior probability determination can be greatly speeded up.

This is accomplished as follows. Before cycling over al the records in the data set, the joint probability of each cluster and the default record is first calculated (determined)—that is, a joint probability based on the default value of each attribute is initially generated. PD(c) is used to denote these initially generated values. The default record for which this determination is made is a record that may or may not actually exist in the data set, for which every attribute has a value equal to the default value.

Then, for each record in the data set, in 414, PD(c) is multiplied, for each value c, by a set of correction terms, where there is a single correction term for each attribute that does not appear in its default state. That is, the posterior probability is determined based on the joint probability, and the posterior probability is corrected upon determining that the value of an attribute of the record varies from the default value.

In particular, let $\{d_1, \ldots, d_n\}$ denote the default values for the attributes $\{A_1, \ldots, A_n\}$, respectively. The joint probability of each cluster c and the default case is (see above)

$$PD(c) = p(C = c, A_1 = d_1, \ldots, A_n = d_n, \Theta) = \theta_{C=c} \prod_{i=1}^{n} \theta_{A_i=d_i|C=c}$$

Suppose that attribute $A_i$ takes on value $a_i \neq d_i$. PD(c) is corrected for each such non-default attribute by multiplying by the following correction term L(c, $A_i$, $a_i$):

$$L(c, A_i, a_i) = \frac{\theta_{A_i=a_i}}{\theta_{A_i=d_i}}$$

Let φ(n) denote the set of indices of the attributes in record n that do not have their default state in case n. For example, in the sparse dataset shown above, φ(1)={3}, φ(2)={1}, φ(3)={ }, φ(4)={2}, φ(5)={2,3}, ανδφ(6)={ }. The joint probability for cluster c and record n can now be expressed as $$p(C = c, \text{record } n | \Theta) = PD(c) \cdot \prod_{i \in \phi(n)} L(c, A_i, a_i)$$

where $a_i$ is the (non-default) value for attribute $A_i$ in record n.

It is noted that after calculating PD(c), 414, 416 and 418 are applied for each record in the data set. That is, the default statistics are derived after this can is done.

As has been described, for each record the posterior probability of the cluster node is obtained by dividing each joint probability by the accumulated sum of joint probabilities, where the sum is taken over all values of c.

Next, in 416 (still part of the E part of the EM algorithm), first sufficient statistics are incremented by the posterior probability determined in 414. The first sufficient statistics relate to a joint probability distribution over the set of attributes. That is, S(C=c) is incremented by post(c,n), for all values of C.

In 418, second sufficient statistics are incremented by the posterior probability determined in 414. The second sufficient statistics relate to a joint probability distribution over the cluster membership. That is, for each attribute $A_i$, let j denote the value of $A_i$ in record n, and increment $S(A_i=j, C=c)$ by post(c,n) for all values of C.

The incrementation performed in 418 is also speeded up due to the sparse representation of the data set. In particular, only the expected sufficient statistics $S(A_i=j, C=c)$ are updated for those values of $j$ that are not the default value of $A_i$. The sufficient statistics corresponding to the default values are derived from the others after the data has been scanned. In particular, once the expected sufficient statistics have been calculated for the non-default values for each $A_i$, the remainder of the sufficient statistics can be derived as follows:

$$S(A_i = d_i, C = c) = S(C = c) - \sum_{j \neq d_i} S(A_i = j, C = c)$$

Thus, the second sufficient statistics are incremented only upon determining that the values of the attributes of the record vary from the default values (any of the values of any of the attributes).

After performing the E part of the (modified) EM algorithm, the method proceeds to 412, in which the M part of the algorithm is performed. In 412, the parameters regarding the data model are updated. More specifically, for each value c, the cluster parameters are reset as follows:

$$\theta_{C=c} = \frac{S(C=c)+1}{N+r_C}$$

(It is noted that this is an example of softening; the M part of the algorithm is not limited to the 1 and $r_c$ in the numerator and denominator, respectively, as can be appreciate by those of ordinary skill within the art.)

For each value c of C, for each attribute $A_i$, and for each value j of attribute $A_i$, the attribute parameters are reset as follows:

$$\theta_{A_i=j|C=c} = \frac{S(A_i=j, C=c)+1}{S(C=c)+r_{A_i}}$$

Once the M part of the algorithm has been performed, the E part in 410 is again performed until a predetermined convergence criterion has been reached, as has been described. Thereafter, the method proceeds to 420. In 420, the resulting set of parameters obtained by the EM algorithm are used to assign cluster membership to each record in the data set. In other word, 420 is the last part of 404, in which a data model is generated.

The data model is then output in 422. The invention is not limited to the manner by which the data model is output. For example, in one embodiment, it can be output to a further analysis program or software component, that allows for conclusions to be drawn regarding the data set, as the data model was generated therefrom (specifically, the individual clusters in which each record was assigned). As another example, a diagram of the data model, an example of which was shown in FIG. 2, can be displayed on a displayed device, or printed to a printer, etc. Thus, the invention provides for in one embodiment speeded-up clustering as a part of the outputting in 422.

System

In this section, a system according to an embodiment of the invention. The system described herein can in one embodiment by the manner by which the method according to the previous section of the detailed description is implemented. However, the invention is not so limited. The description of the system is made in conjunction with FIG. 5.

Figure 5:
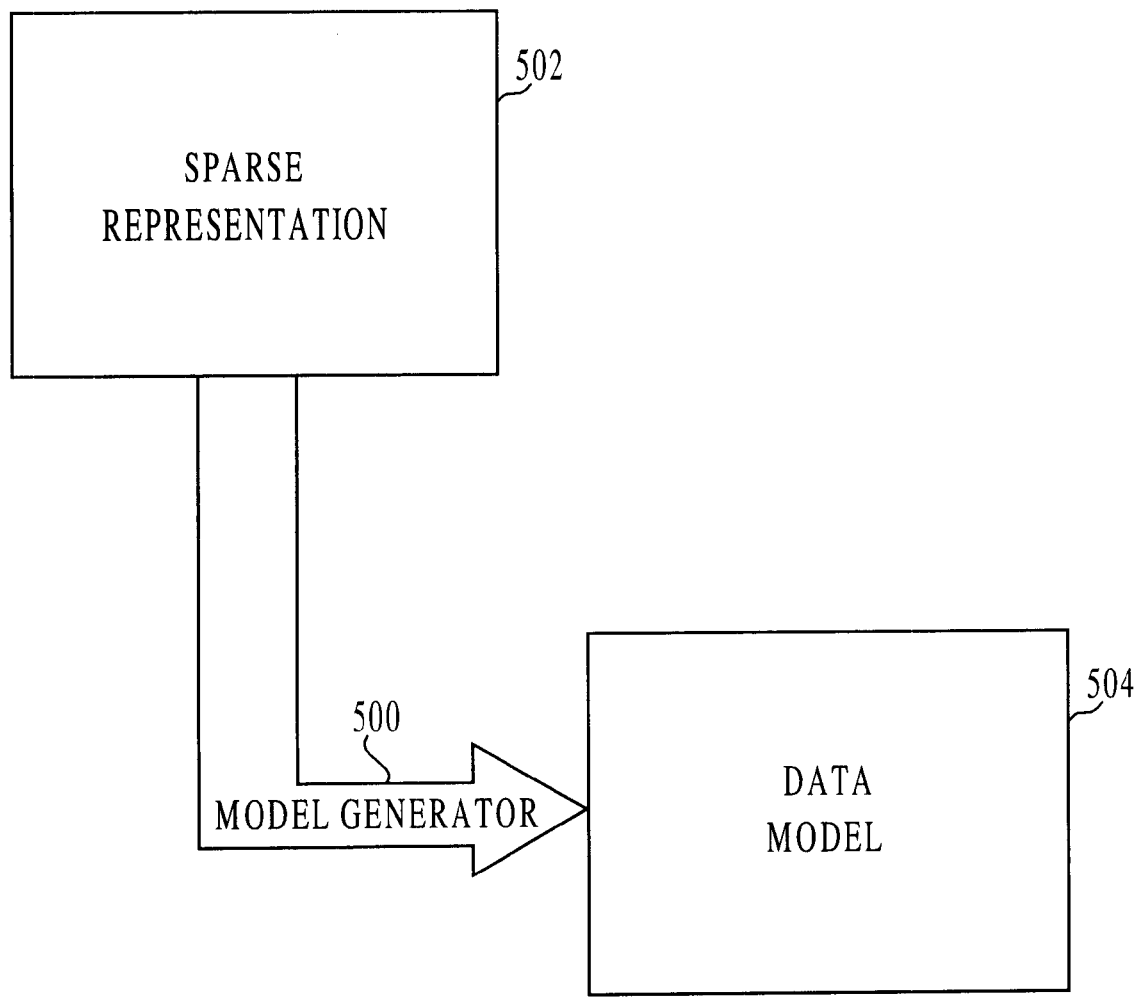

Referring now to FIG. 5, a system according to an embodiment of the invention is shown. The model generator 500 receives as an input a sparse representation of a data set 502, and generates as an output a data model 504 corresponding to the data set. In one embodiment, the model generator 500 is a computer program, although the invention is not so limited.

The sparse representation 502 includes a plurality of records of a data set, where each record has at least one attribute, and each attribute has a default value, as has been described. That is, the sparse representation is such that it includes the value of an attribute of a record only if the value varies from the default value for that attribute. The data model 504 is based on the sparse representation 502, and in one embodiment is a naïve-Bayes model as has been described. Thus, in one embodiment, the generator 500 utilizes the modified EM algorithm as described in the previous section of the detailed description to generate the data model 504. The generator 500 thus utilizes the data model 504 generated to speed up clustering of the sparse representation of each record.

Continuous and Ordered Variables

It is noted that as described, embodiments of the invention can be used with both continuous variables and ordered variables, if they are used with domains for which the presence or absence of these values in the data is informative.

Continuous and ordered variables are known in the art. A continuous variable can be defined as taking on values from one or more interval of the real line; temperature is an example. An ordered variable can be defined as taking on values from one or more (potentially infinite) intervals from the set of integers; years of education is an example of an ordered variable.

The techniques described in this application can be applied to these types of variables by treating them as special binary variables: either the variable was present or absent in the data. Statistics are kept track for the variables that are present.

For clustering specifically, it is recalled that when deriving the posterior probability of each cluster, and when making predictions about someone in a given cluster, the following term is used $$p(A_i=j|C=c, \Theta)=\theta_{A_i=j|C=c}$$

This equation is referred to as Equation 1. For continuous and ordered variables, this term is replaced with another one that also depends on the parameters $\Theta$. Let X denote a continuous or ordered variable. For both types of variables, there are two parameters that denote the probability that X is missing or present:

$$p(X \text{ is missing}|C=c, \Theta)=\theta_{X \text{ is missing}|C=c}$$

$$p(X \text{ is present}|C=c, \Theta))=\theta_{X \text{ is present}|C=c}$$

Note that because X must be either missing or present, these two probabilities must sum to one, and only one of them need be stored in the model.

In many applications, it may be desired to extend the above model to represent a probability distribution over X, given that X is present.

For continuous variables specifically, there is a probability density function for the continuous values that are present. A density function ρ assigns a value to each x such that the probability that x lies in some interval $(x_a, x_b)$ is:

$$p(x_a \leq X \leq x_b \mid C=c, \Theta) = \int_{x_a}^{x_b} \rho(X=x \mid C=c, \Theta)dx$$

For example, ρ could be a Gaussian (normal) distribution.

Thus, Equation 1 is replaced with the following for continuous variables:

If X is missing:

$$p(X \text{ is missing} \mid C=c, \Theta) = \theta_{X \text{ is missing} \mid C=c}$$

If X is present and equal to x:

$$p(X \text{ is present and } X=x \mid C=c, \Theta) = \theta_{X \text{ is present} \mid C=c} \times \rho(X=x \mid C=c, \Theta)$$

For ordered variables specifically, such variables are treated almost the same as continuous variables, except that instead of a continuous distribution ρ, a distribution is used that is defined over the set of integers. The poisson distribution is an example:

$$p(X=k \mid C=c, \mu) = e^{-\mu} \frac{\mu^k}{k!}$$

Furthermore, with respect to clustering both ordered and continuous variables, it is noted that a best default value for a continuous or ordered variable will almost certainly be the missing state; otherwise, the default state would correspond to "present and equal to x". Because the ranges of these variables are potentially infinite, it is unlikely that most of the values will be present and equal to the same number.

Therefore, the correction term is used as before. For continuous variables with "presence distribution" ρ, $$L(c, X, x) = \frac{\theta_{X \text{ is present} \mid C=c} \times \rho(X=x \mid C=c, \Theta)}{\theta_{X \text{ is missing} \mid C=c}}$$

For ordered variables, ρ is replaced by the distribution over the integers, such as a poisson distribution.

In many applications, "missing" will correspond to a known value. For instance, consider the television example, and assume modeling the duration of time that people watches each show is the point of interest. If for a given person, no length of time is given for a particular show, it is known that the person watched the show for a duration of zero minutes. For those people that watched the show, the point of interest may be in the average and standard deviation of the duration.

Conclusion

Data modeling utilizing a sparse representation of a data set has been described. Although specific embodiments have been illustrated and described herein, it will be appreciated by those of ordinary skill in the art that any arrangement which is calculated to achieve the same purpose may be substituted for the specific embodiments shown. For example, while embodiments of the invention have been explained largely in reference to the EM algorithm, the invention itself is not necessarily so limited. This application is intended to cover any adaptations or variations of the present invention. Therefore, it is manifestly intended that this invention be limited only by the following claims and equivalents thereof.

I claim:

1. A computer-implemented method that facilitates fast clustering of a data set defined for a plurality of attributes, comprising:

inputting the data set, the data set having a plurality of records each having a value for each attribute, wherein the value for each attribute is selected from a plurality of possible values, one value from the plurality of possible values is designated a default value for the attribute;

storing a sparse representation of each record, including storing the value of the attribute of the record only upon determining that the attribute of the record has a value varying from the default value;

clustering each record using the sparse representation of the record;

generating a data model of the data set, utilizing the sparse representation of each record; and, outputting the data model.

2. The method of claim 1, wherein at least one record has a plurality of attributes, each attribute having a default value.

3. The method of claim 1, wherein generating a data model of the data set comprises:

updating a plurality of sufficient statistics for each record;

updating parameters regarding the data model; and, assigning cluster membership to each record.

4. The method of claim 3, wherein updating sufficient statistics for each record comprises:

determining a posterior probability;

incrementing a first sufficient statistics of the plurality of sufficient statistics by the posterior probability; and, incrementing a second sufficient statistics of the plurality of sufficient statistics by the posterior probability.

5. The method of claim 4, wherein the first sufficient statistics relates to a joint probability distribution over a set of attributes including the attribute of each record.

6. The method of claim 4, wherein the second sufficient statistics relates to a joint probability distribution over the cluster membership.

7. The method of claim 4, wherein determining a posterior probability comprises:

initially generating a joint probability based on the default value of the attribute of the record;

determining the posterior probability based on the joint probability; and, correcting the posterior probability upon determining that the value of the attribute of the record varies from the default value.

8. The method of claim 4, wherein incrementing a second sufficient statistics of the plurality of sufficient statistics comprises incrementing the second sufficient statistics of the plurality of sufficient statistics only upon determining that the value of the attribute of the record varies from the default value of the attribute.

9. The method of claim 3, wherein generating a data model further initially comprises initializing the parameters regarding the data model in accordance with a predetermined manner.

10. A machine-readable medium having processor instructions stored thereon for execution by a processor to case performance of a method that facilitates fast clustering of a data set defined for a plurality of attributes, comprising:

inputting the data set, the data set having a plurality of records each having a value for each attribute, wherein the value assigned to each attribute is selected from a plurality of possible values, one value from the plurality of possible values is designated a default value;

storing a sparse representation of each record, including storing the value of the attribute of the record only upon determining that the attribute of the record has a value varying from the default value;

clustering each record using the sparse representation of the record;

generating a data model of the data set, utilizing the sparse representation of each record; and, outputting the data model.

11. The medium of claim 10, wherein at least one record has a plurality of attributes, each attribute having a default value.

12. The medium of claim 10, wherein generating a data model of the data set comprises:

updating a plurality of sufficient statistics for each record;

updating parameters regarding the data model; and, assigning cluster membership to each record.

13. The medium of claim 12, wherein updating sufficient statistics for each record comprises:

determining a posterior probability;

incrementing a first sufficient statistics of the plurality of sufficient statistics by the posterior probability; and, incrementing a second sufficient statistics of the plurality of sufficient statistics by the posterior probability.

14. The medium of claim 13, wherein the first sufficient statistics relates to a joint probability distribution over a set of attributes including the attribute of each record.

15. The medium of claim 13, wherein the second sufficient statistics relates to a joint probability distribution over the cluster membership.

16. The medium of claim 13, wherein determining a posterior probability comprises:

initially generating a joint probability based on the default value of the attribute of the record;

determining the posterior probability based on the joint probability; and, correcting the posterior probability upon determining that the value of the attribute of the record varies from the default value.

17. The medium of claim 13, wherein incrementing a second sufficient statistics of the plurality of sufficient statistics comprises incrementing the second sufficient statistics of the plurality of sufficient statistics only upon determining that the value of the attribute of the record varies from the default value of the attribute.

18. The medium of claim 12, wherein generating a data model further initially comprises initializing the parameters regarding the data model in accordance with a predetermined manner.

19. A computerized system comprising:

a sparse representation of each record of a plurality of records of a data set, each record having a plurality of attributes, each record having a value for each attribute, wherein the value for each attribute is selected from a plurality of possible values, one value from the plurality of possible values is designated a default value, such that the sparse representation includes the value of the attribute of the record only upon the attribute of the record having a value varying from the default value;

a data model of the data set, based on clusters of each record using the sparse representation of each record; and, a model generator to generate the data model from the clustered sparse representation.

20. The system of claim 19, wherein the model generator comprises a computer program.

21. The system of claim 19, wherein the model generator performs a method comprising:

updating a plurality of statistics for each record;

updating parameters regarding the data model; and, assigning cluster membership to reach record.

22. The system of claim 21, wherein updating sufficient statistics for each record comprises:

determining a posterior probability;

incrementing a first sufficient statistics of the plurality of sufficient statistics by the posterior probability; and, incrementing a second sufficient statistics of the plurality of sufficient statistics by the posterior probability.

23. The system of claim 22, wherein the first sufficient statistics relates to a joint probability distribution over a set of attributes including the attribute of each record.

24. The system of claim 22, wherein the second sufficient statistics relates to a joint probability distribution over the cluster membership.

25. The system of claim 22, wherein determining a posterior probability comprises:

initially generating a joint probability based on the default value of the attribute of the record;

determining the posterior probability based on the joint probability; and, correcting the posterior probability upon determining that the value of the attribute of the record varies from the default value.

26. The system of claim 22, wherein incrementing a second sufficient statistics of the plurality of sufficient statistics comprises incrementing the second sufficient statistics of the plurality of sufficient statistics only upon determining that the value of the attribute of the record varies from the default value of the attribute.

27. The system of claim 21, wherein generating a data model further initially comprises initializing the parameters regarding the data model in accordance with a predetermined manner.

* * * * *